(12) United States Patent
Heddles et al.

(10) Patent No.: US 8,733,529 B2
(45) Date of Patent: May 27, 2014

(54) CHUTE FOR MATERIALS AND METHOD OF MAKING THE SAME

(75) Inventors: Willard P. Heddles, Tiffin, OH (US);
Thomas P. Troiano, Sycamore, OH (US)

(73) Assignee: Tiffin Metal Products Co., Tiffin, OH (US)

( * ) Notice: Subject to any disclaimer, the term of this patent is extended or adjusted under 35 U.S.C. 154(b) by 103 days.

(21) Appl. No.: 13/406,670

(22) Filed: Feb. 28, 2012

(65) Prior Publication Data

US 2012/0217125 A1 Aug. 30, 2012

Related U.S. Application Data

(60) Provisional application No. 61/447,400, filed on Feb. 28, 2011.

(51) Int. Cl.
*B65G 11/06* (2006.01)

(52) U.S. Cl.
USPC ............................................................ 193/12

(58) Field of Classification Search
USPC ............ 198/778; 192/12, 2 R, 13, 27, 33, 34; 193/12, 2 R, 13, 27, 33, 34
See application file for complete search history.

(56) References Cited

U.S. PATENT DOCUMENTS

| | | | | | |
|---|---|---|---|---|---|
| 1,312,995 | A | * | 8/1919 | Lister | 193/12 |
| 1,515,890 | A | * | 11/1924 | Sekulski | 193/12 |
| 1,712,714 | A | * | 5/1929 | Pardee | 193/12 |
| 1,722,675 | A | * | 7/1929 | Pardee et al. | 193/12 |
| 1,800,067 | A | * | 4/1931 | Godinez | 193/12 |
| 1,802,089 | A | * | 4/1931 | Pfeiffer | 193/12 |
| 2,437,259 | A | * | 3/1948 | Kautz | 193/12 |
| 4,726,456 | A | * | 2/1988 | Hogsett | 193/12 |
| 5,598,914 | A | * | 2/1997 | Sulzer et al. | 193/12 |

* cited by examiner

*Primary Examiner* — James R Bidwell
(74) *Attorney, Agent, or Firm* — Marshall & Melhorn, LLC (57) ABSTRACT

A modular chute, down which to slide articles, that is made of: a a frame made of a rib, a bracket, a backbone member connected to either the rib or the bracket or to both the rib and the bracket, and a guide member connected to either the rib or the bracket or to both the rib and the bracket, and a curvilinear panel connected to the frame, and a lining disposed within the frame, where the lining is made from a plurality of sections.

31 Claims, 7 Drawing Sheets

CHUTE FOR MATERIALS AND METHOD OF MAKING THE SAME

RELATED APPLICATIONS

This application is claiming the benefit, under 35 U.S.C. §119(e), of the provisional application filed Feb. 28, 2011 under 35 U.S.C. §111(b), which was granted Ser. No. 61/447,400. This provisional application is hereby incorporated by reference in its entirety.

BACKGROUND OF THE INVENTION

Chutes and slides, which will be used interchangeably here, are well-known devices for moving a wide variety of articles from one location to another. Often, the articles located in the chute move from an upper location to a lower location, by sliding down the chute via the force of gravity. Mechanical, electrical and/or human means may also provide the necessary force to move the articles down the chute, in addition to gravity.

Chutes may be constructed of a wide variety of materials. Often the material from which a chute is constructed is a function of how it is to be used and the articles that are slid down the chute. By way of example only, chutes constructed of fiberglass are often used for relatively lightweight articles. It has been found that when heavy articles are slid on fiberglass chutes, the articles wear the fiberglass down. Gaps, holes and tears can develop in the fiberglass which may catch articles and prevent them from moving in the chute.

Fiberglass chutes also suffer from another disadvantage regardless of the kind of articles that are slid on them. Namely, the chutes must be created from molds. The molds are expensive and only an exact duplicate of the mold can be created. The molds cannot be readily adapted to accommodate even the smallest desired change in the chute.

It is also known to use steel, or other metals, to construct chutes. While these chutes often can accommodate heavier articles, they also suffer from several disadvantages. One disadvantage is that their components are generally welded together. When one component fails, is damaged, or in need of repair, the weld often results in much more than just the single component needing to be removed. Instead, in such a situation, sections adjacent the component must also be removed or are caused to be removed by the removed component; in some cases, the entire chute must be removed. Additionally, because chutes can be located in very hard to reach areas, welds make it impossible to remove individual sections and the entire chute must be removed. This results in the original investment in the chute being wasted or much greater expense to repair the chute being incurred.

All of the prior art chutes also suffer from another disadvantage. Namely, it is often desirable to use a chute for articles of different weights and sizes, all of which may have varying lubricities, and for those articles to travel along the chute at a predetermined rate. However, when a chute constructed of a single material, with a fixed shape and pitch, is used in a way that it was not designed for, it often results in the articles in the chute not moving as it should. The result can be a chute clogged with articles, damage to the chute or articles within it.

In view of just some of the mentioned disadvantages of the prior art chutes, it would be advantageous for a chute to be readily adaptable to articles of various sizes, shapes, and lubricities. It would also be advantageous for the rate at which the chute transports articles to be adaptable to the desired situation. It would also be advantageous for the chute to be readily repairable and to replace any portion easily and efficiently.

SUMMARY OF THE INVENTION

A modular chute for moving articles from one location to another is depicted and described. The modular chute allows for easy repair or replacement of any damaged sections. The modular chute is also readily adaptable and changeable to a wide range of uses and locations, where these adaptations and changes can be made with less expense than if the chute had been made with a solely fiberglass or solely steel lining. The modular chute allows for the lining to be comprised of areas of different lubricities so that a user can achieve desired control over rates of flow of articles down the chute.

These and other features and advantages of the present invention will be better understood and its advantages will be more readily appreciated from the detailed description of the preferred embodiment, especially when read with reference to the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

Figure 1:
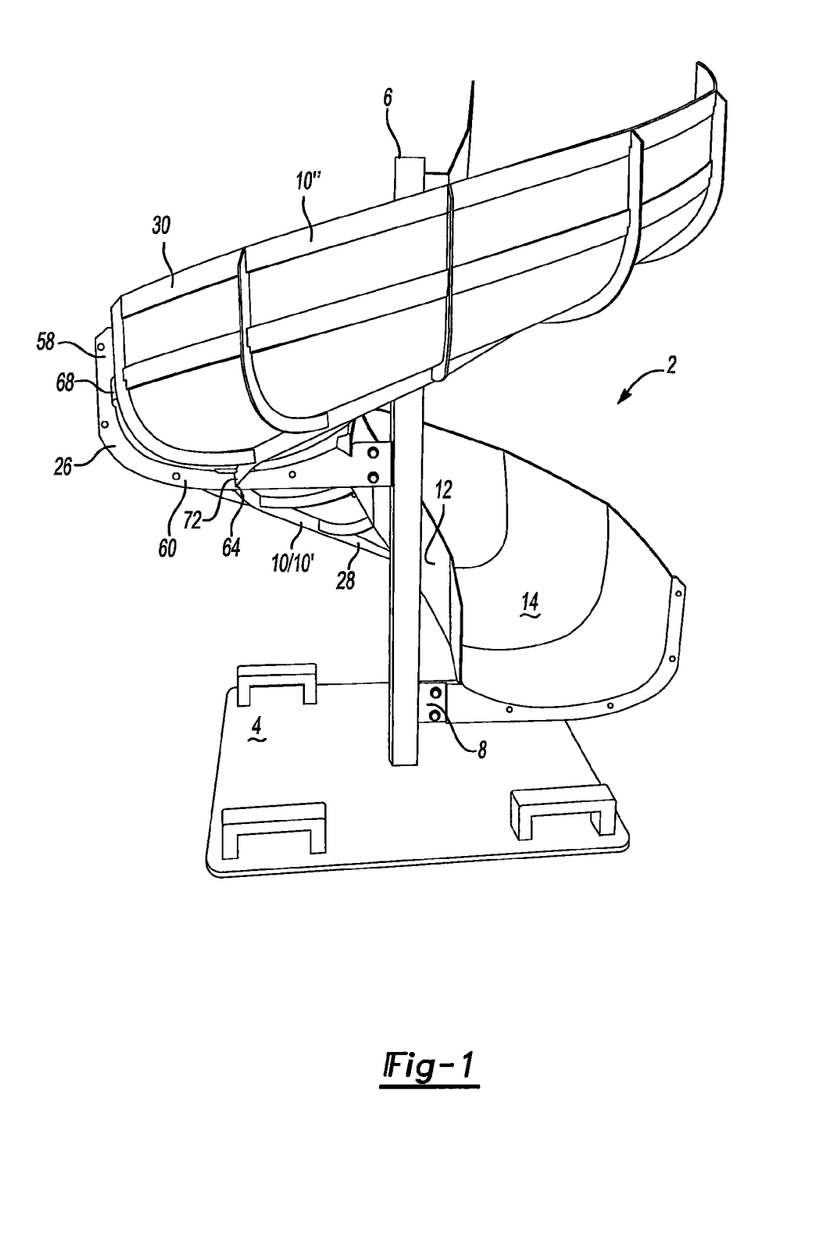
FIG. 1 is a side view of one embodiment of the invention.

FIG. 1 depicts one embodiment of at least a portion of a modular chute 2. The chute 2 is comprised of many different pieces. By way of example, the chute may comprise a base 4, a stanchion 6, a flange 8 extending from the stanchion 6, a frame 10 connected to the stanchion 6, a curvilinear panel 12, and a lining 14 disposed within the frame 10. While the invention described herein contemplates a chute can be constructed using any number of frames (contributing to the modular nature of the claimed invention), the chute 2 in FIG. 1 depicts a first frame 10' and a second frame 10".

Figure 2:
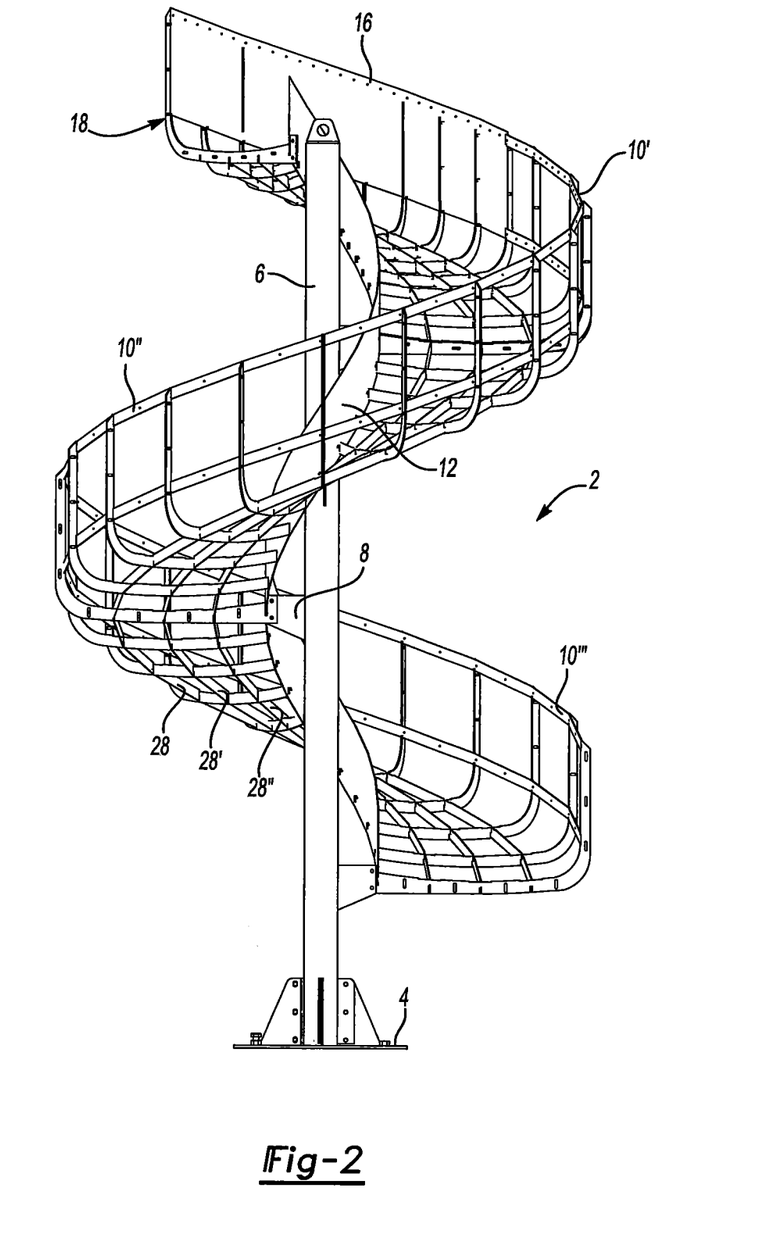
FIG. 2 is a side view of another embodiment of the invention.

FIG. 2 depicts another embodiment of at least a portion of modular chute 2. This chute 2 is shown without a lining for better viewing of the construction of the frame 10 that would normally be hidden from view. The particular embodiment shown here comprises a first frame 10', a second frame 10", and a third frame 10'". In addition to the base 4, the stanchion 6, the flange 8 extending from the stanchion 6, the frame 10 connected to the stanchion 6, and the curvilinear panel 12, the depicted embodiment also comprises an outside guide panel 16 at the upstream entrance 18 to the chute 2.

Figure 3A:
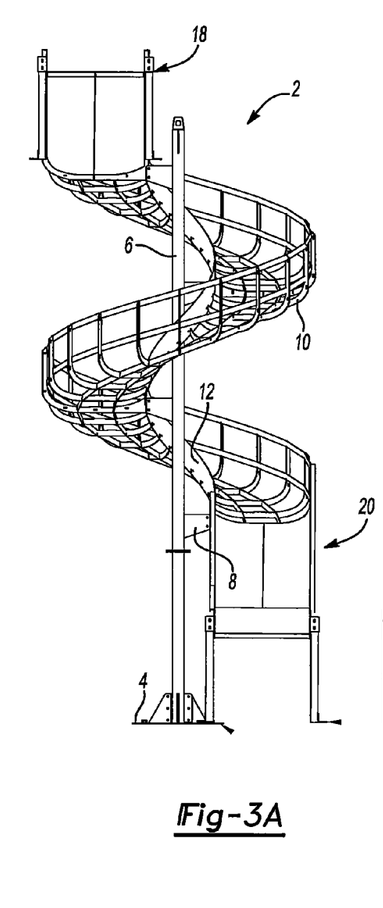
FIGS. 3A and 3B are side views of various embodiments of the invention.
Figure 3B:
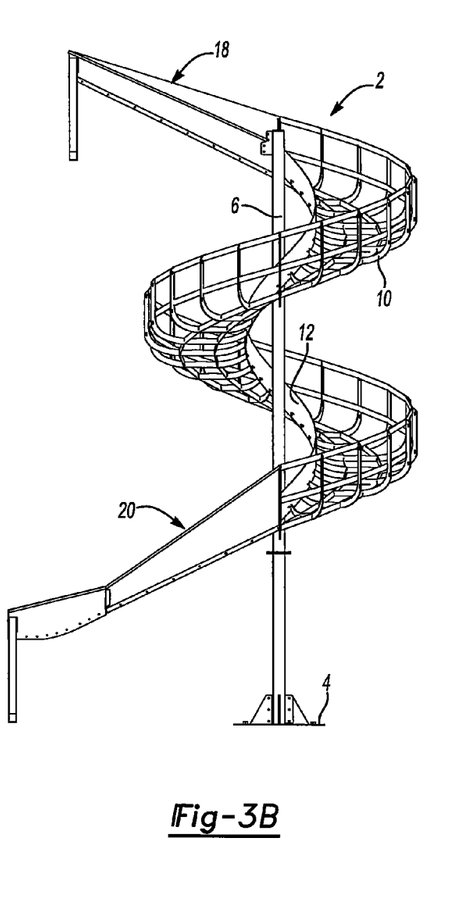

FIGS. 3A and 3B each show different embodiments of the modular chute 2 without the lining. In addition to the components seen in FIG. 1, the chute 2 in FIGS. 3A and 3B each a show different upstream entrance 18 to the chute 2, thus illustrating the ability of users to construct a chute to fit their specific needs. Further, FIGS. 3A and 3B each a show different downstream exit 20 from the chute 2. It should be appreciated that any entrance or exit system can be used without falling outside of the scope of the present invention.

Figure 4A:
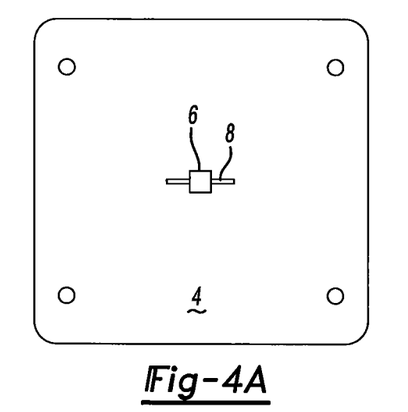
FIGS. 4A and 4B show a top view of one embodiment for a stanchion, a base, and flange in accordance with an embodiment of the present invention and a side view of the stanchion, base and flanges.
Figure 4B:
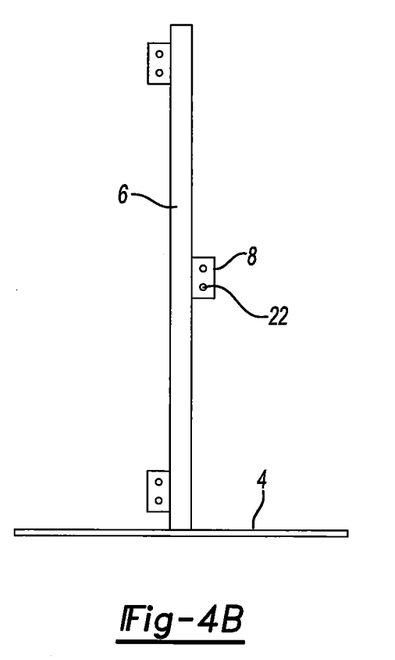
Figure 8:
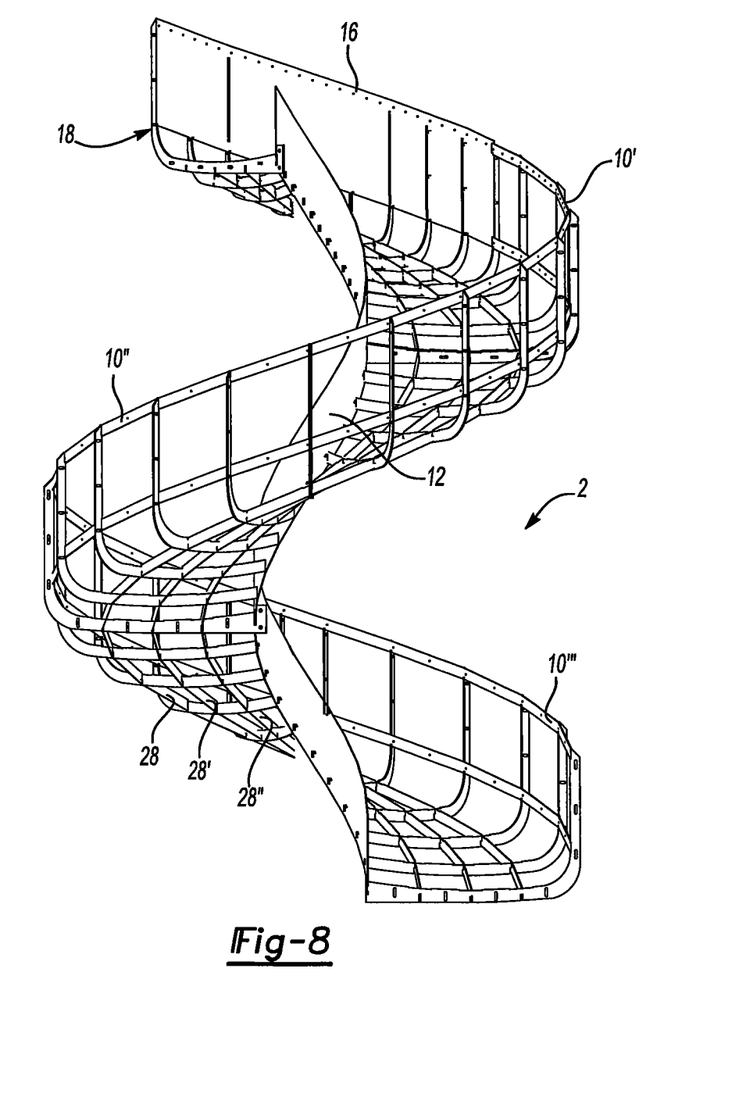
FIG. 8 depicts a side view of an alternative embodiment of the invention.

FIG. 4 shows two views of a base 4, a stanchion 6, and a flange 8 connected to the stanchion 6 according to one embodiment of the present invention. In this embodiment, the stanchion 6 is connected to the base 4. However, it can be appreciated that the stanchion 6 may be mounted directly to a floor or other support structure. Further, as shown in FIG. 8, the frame 10 of the chute 2 can be used in isolation from a stanchion.

The base 4 may be a plate, such as a metal plate of any shape, size or thickness. In this embodiment, the plate has a square shape and substantially parallel upper and lower surfaces defining a substantially constant thickness.

The stanchion 6 may be connected to a middle portion of the base 4. The connection may be through welding and/or mechanical fasteners. The stanchion 6 may extend substantially perpendicular to the upper surface of the base 4.

In the depicted embodiment, the stanchion 6 has four sides, however, a greater number or a fewer number of sides are permissible. The stanchion 6 may have a substantially square cross-section, however, cross-sections of other shapes are also permissible.

A flange 8, and preferably a plurality of flanges 8, is connected to the stanchion 6. The flange 8 may be welded and/or secured to the stanchion 6 with mechanical fasteners at any desired interval. The flange 8 may have apertures 22 for receiving mechanical fasteners to connect a frame 10 (not shown in FIG. 4) of a chute 2 (not shown in FIG. 4) with the stanchion 6.

Figure 5:
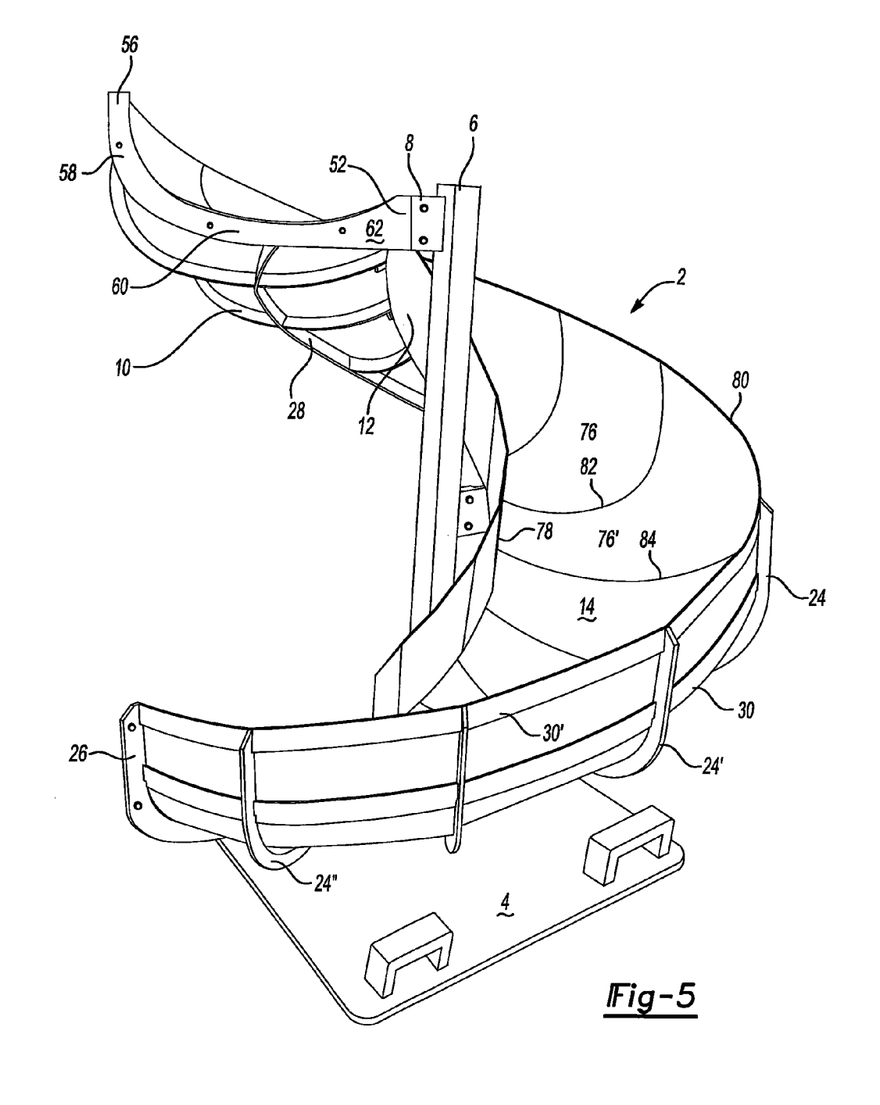
FIG. 5 is a side view of one embodiment of the invention.
Figure 6:
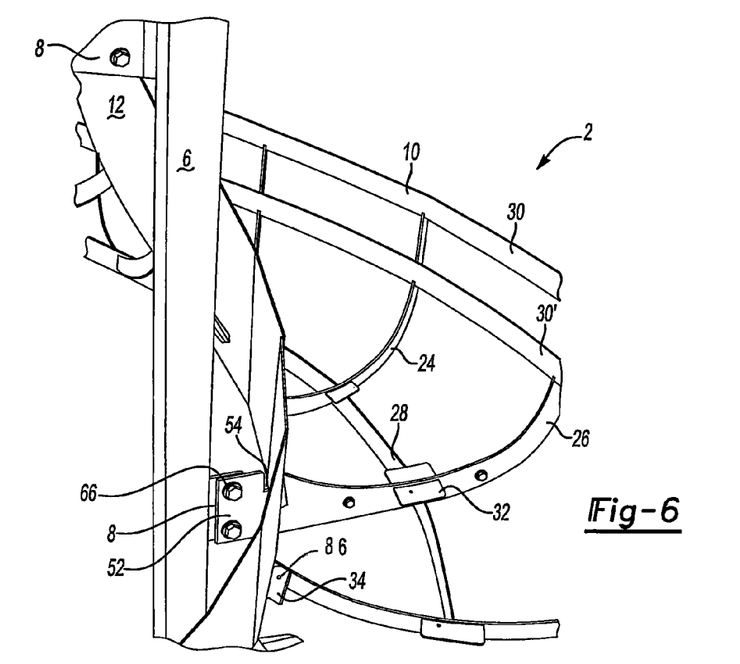
FIG. 6 depicts one embodiment of the invention showing part of a chute, with no lining.
Figure 7:
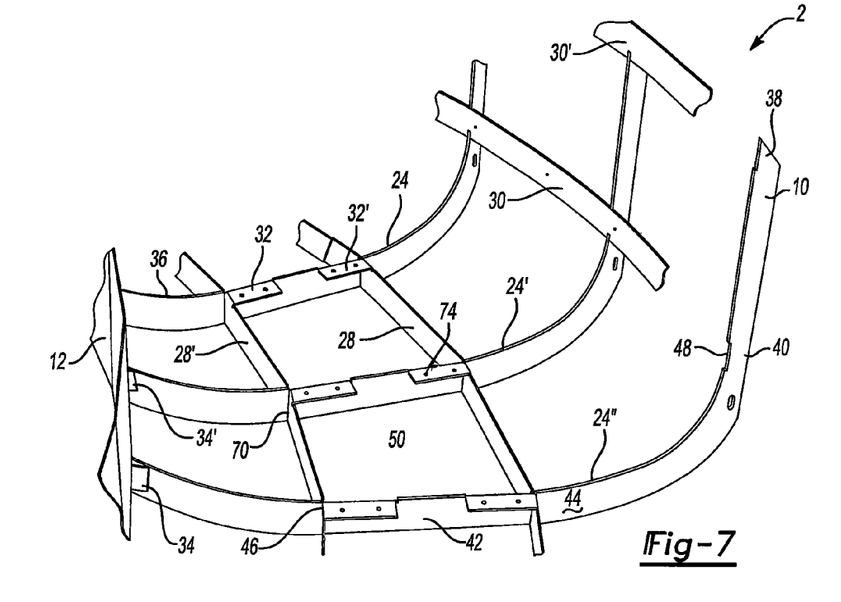
FIG. 7 depicts one embodiment of the invention showing part of a chute with no lining.

As shown by way of example in FIG. 5, the frame10 itself may also be comprised of many different pieces. For instance, a frame 10 may comprise a rib 24, a bracket 26, a backbone member 28, and a guide member 30. Preferably, a frame 10 may comprise a plurality of ribs 24, as shown in FIG. 5. In addition, as shown in FIGS. 6 and 7, a frame 10 may further comprise either or both of a center tab 32 and a side tab 34. As shown, FIG. 5 depicts one embodiment of a chute 2 with a frame 10 that comprises a single backbone member 28. In an alternative embodiment, FIG. 7 shows a chute 2 with a frame 10 that comprises two backbone members 28. Three backbone members 28 can be seen in the embodiment shown in FIG. 2. As these illustrations suggest, it should be appreciated that any number of backbone members can be used in constructing the modular chutes of the invention. Further, as highlighted throughout this description, the ability to vary both the spacing between the components of the frame 10, and how they specifically relate to one another spatially, results in a chute 2 that can be tailored easily to best suit the end use.

Similarly, and as depicted at least in FIGS. 5, 6, and 7, multiple guide members 30, multiple center tabs 32, and multiple side tabs 34 can be utilized. Thus, it will be appreciated that a chute made with either one or more than one of the various components is not beyond the scope of the present invention. In fact, the flexibility in the number of components used is one factor that leads to the modular nature of the chutes of the present invention.

As shown in FIG. 7, any one rib 24 has a first end portion 36, a second end portion 38, an upstanding portion 40, a base portion 42, a first surface 44, and a second surface (not shown). The base portion 42 of the rib 24 may further have a slot 46 disposed therein for receiving the backbone member 28. The upstanding portion 40 of the rib 24 may further have a notch 48 disposed therein for receiving the guide member 30. Preferably, all of the rib portions are unitary.

The first end portion 36 of a rib 24 may be connected to a curvilinear panel 12. This connection may be directly between the first end portion 36 of rib 24 to a curvilinear panel 12 using a weld or mechanical fastener(s). The connection may also be through the use of a side tab 34. The side tab 34, if used, may be connected both (i) to the curvilinear panel 12 in a plane substantially transverse to the curvilinear panel 12 and (ii) to the first end portion 36 of the rib 24 in a plane at an oblique angle to the first end portion 36 of the rib 24. This type of connection is best seen with the side tab 34 labeled in FIG. 6.

As depicted in FIG. 7, the ribs 24 extend outwardly from the curvilinear panel 12. The ribs 24 are spaced so that a predetermined gap 50 is located between them. Greater or fewer ribs 24 than depicted in the figures may be used and the gaps 50 may therefore be larger or smaller than shown an of varying sizes, thus helping to provide for the modular nature of the chute 2.

FIG. 6 also shows that any one bracket 26 may have an attachment end portion 52, with a groove 54 disposed therein. FIG. 5 illustrates the bracket may have a non-attachment end portion 56, an upstanding portion 58, a base portion 60, a first surface 62, and a second surface (not shown). A bracket 26 may be connected to the chute by securing the attachment end portion 52 of the bracket 26, which may further comprise apertures 66 for receiving mechanical fasteners, with mechanical fasteners to flange 8 extending from the stanchion 6. As seen in FIG. 1, the base portion 60 of the bracket 26 may further have a slot 64 disposed therein for receiving a backbone member 28 and the upstanding portion 58 may have a notch 68 disposed therein for receiving a guide member 30. Preferably, all of the bracket portions are unitary.

As illustrated in FIGS. 5, 6, and 7, the rib 24, the bracket 26, or both rib 24 and bracket 26, may be supported by backbone member 28. The backbone member 28 may be a single piece or it may be a plurality of pieces connected together. The backbone member 28 may be formed from a substantially flat piece of material. Preferably the material is a metal material, such as aluminum or steel. The backbone member 28 may be located below the rib 24, the bracket 26, or both the rib 24 and bracket 26. The backbone member 28 may be connected to the rib 24, the bracket 26, or both the rib 24 and bracket 26. More particularly, the backbone member 28 may be connected to the base portion 42 of a rib 24, the base portion 60 of a bracket 28, or both the base portions 42, 60 (respectively) of rib 24 and bracket 28.

Preferably, a slot 46 for receiving the backbone member 28 may be disposed in the base portion 42 of a rib 24. The slot 46 may extend into the base portion 42 of the rib 24 to a depth equal to the depth of a matching slot 70 disposed in the backbone member 28, such that, after assembly, the slot 46 disposed in the base portion 42 of the rib 24 interlocks with the matching slot 70 on the backbone member 28. After interlocking, the connection formed between the rib and the backbone member may be further secured through welding or other mechanical fasteners.

Likewise, preferably, as shown in FIG. 1, a slot 64 for receiving a backbone member 28 may be disposed in the base portion 60 of a bracket 26. The slot 64 may extend into the base portion 60 of the bracket 26 to a depth equal to the depth of a matching slot 72 disposed in the backbone member 28, such that, after assembly, the slot 64 disposed in the base portion 60 of the bracket 26 interlocks with the matching slot 72 on the backbone member 28. After interlocking, the connection formed between the bracket 26 and the backbone member 28 may be further secured through welding or other mechanical fasteners.

Likewise, the guide member 30 may be connected to the rib 24, the bracket 26, or both the rib 24 and the bracket 26. The guide member 30 may be connected to the upstanding portion 40 of rib 24, the upstanding portion 58 of bracket 26, or both the upstanding portions 40, 58 respectively of rib 24 and bracket 26. In the embodiments depicted in FIGS. 1, 5, 6, and 7, for example, two guide members 30 are located along both the upstanding portion 40 of each rib 24 and the upstanding portion 58 of each bracket 26. The guide member 30 may be a single piece or it may be a plurality of pieces connected together. The guide member 30 may be formed from a substantially flat piece of material. Preferably the material is a metal material, such as aluminum or steel.

Preferably, a notch 48 or 66 for receiving the guide member 30 may be disposed in the upstanding portion 40 of the rib 24, the upstanding portion 58 of the bracket 26 or both the upstanding portions 40, 58 respectively of rib 24 and bracket 26. The connection formed between (i) the guide member 30 and (ii) the rib 24, the backbone 26, or both the rib 24 or bracket 26 may be further secured through welding or other mechanical fasteners.

As depicted at least in FIG. 6, a frame 10 may also further comprise a side tab 34. A side tab 34 may be formed from a substantially flat piece of material. Preferably the material is a metal material, such as aluminum or steel. The side tab 34 may have dimensions such that the length is greater than its width and a thickness is less than either the length or width. The side tab 34 may be bent across its width at an angle such that the side tab 34 can be in contact with both (i) the curvilinear panel 12 in a plane substantially transverse to the curvilinear panel 12 and (ii) either the first 44 or second surface (not shown) of the rib. As noted above, side tab 34 may be connected both (i) to the curvilinear panel 12 in a plane substantially transverse to the curvilinear panel 12 and (ii) to the first end portion 36 of the rib 24 in a plane at an oblique angle to the first end portion 36 of the rib 24. A side tab 34 may also be connected both (i) to the curvilinear panel 12 in a plane substantially transverse to the curvilinear panel 12 and (ii) to a bracket 26 adjacent to the attachment end portion 52 of the bracket 26 in a plane at an oblique angle to the bracket 26 adjacent to the attachment end portion 52 of the bracket 26.

The side tab 34 may be added to the frame to strengthen the connection between the curvilinear panel 12 and a rib 24 or the connection between the curvilinear panel 12 and a bracket 26. Either or both of these connections may be further secured through welding or other mechanical fasteners. The side tab 34 may also have aperture 86 for receiving a mechanical fastener, thereby providing a means for attaching the lining 14 of the chute 2, as described below.

As shown in at least FIGS. 6 and 7, a frame 10 may also further comprise center tab 32. A center tab 32 is formed from a substantially flat piece of material. Preferably the material is a metal material, such as aluminum or steel. The center tab 32 may have dimensions such that the length is greater than its width and a thickness is less than either the length or width. The center tab 32 may also have aperture 74 for receiving mechanical fastener, thereby providing a means for attaching the lining 14 of the chute 2, as described below.

The center tab 32 is connected (i) to the backbone member 28 in a plane substantially transverse to the backbone member 28 and (ii) to the base portion 42 of the rib 24 in a plane substantially transverse to the base portion 42 of the rib 24, or to the base portion 60 of the bracket 26 in a plane substantially transverse to the base portion 60 of the bracket 26. The center tab 32 may be added to the frame 10 to strengthen the connection between the backbone member 28 and a rib 24 or the connection between the backbone member 28 and a bracket 26. Either or both of these connections may be further secured through welding or other mechanical fasteners.

The rib 24, the bracket 26, the guide member 30 and the backbone member 28 together comprise the frame 10. The frame 10 may also comprise a side tab 34, a center tab 32, or both a side tab 34 and a center tab 34. These items are connected to one another, either directly or indirectly. However, any gaps 50 that exist between them are designed to exist for weight savings and to permit the chute 2 to have some flexibility in its shape and design. In the depicted embodiment in FIG. 5, the ribs 24, brackets 26, backbone member 28, and guide members 30 are provided, shaped, and located to form frame 10 for a spiral type chute 2. These same backbone 28 and guide members 30, together, or only some, may be used and adapted to create frames 10 of other shapes and sizes. For example, FIG. 7 depicts a portion of a frame 10 with two backbone members 28, thus providing for a wider chute and thus illustrating the modular nature of a chute in accordance with the present invention.

A modular chute 2 in accordance with the present invention may also comprise curvilinear panel 12. The curvilinear panel 12 may extend along the stanchion 6, such as in a downwardly trending and curving direction. The curvilinear panel 12 may be formed from a sheet of material that is bent into the desired downward trending and curving shape. Preferably the material is a metal, such as aluminum or steel. The curvilinear panel 12 may be formed from a single piece, or may be formed from more than one piece. As described above and shown in FIG. 6, the curvilinear panel 12 may reside in a groove 54 disposed within an attachment end portion 52 of the bracket 26.

As illustrated in FIG. 1, the lining 14 of the modular chute 2 is supported by, and disposed in, the frame 10. FIG. 5 shows illustrates how preferably the lining 14 is comprised of a plurality of sections 76, 76' that are supported by frame 10 and one another. In one embodiment, each section 76 is provided with an inboard edge 78, an outboard edge 80, an upstream edge 82 and a downstream edge 84. The edges 78-84 define the shape of a section 76. Preferably, each section 76 is unitary with itself.

The edges 78-84 may define a section of any size or shape. Each section of the plurality of sections may be polygonal, or curvilinear or entirely circular or oval shaped. In the depicted embodiment of FIG. 5, each section 76 of the plurality of sections is generally trapezoidal in shape. The inboard edge 78 is provided substantially equidistant from but non-planar with the outboard edge 80. The upstream edge 82 and the downstream edge 84 are not parallel but may diverge from one another in the direction from the inboard edge 78 to the outboard edge 80.

The section 76 is connected to the frame 10 by a mechanical fastener. By way of example the inboard edge 78, or a portion adjacent it, may be connected to the side tab 34 by a mechanical fastener. Similarly, the outboard edge 80, or a portion adjacent it, may be connected to guide member 30 by a mechanical fastener. In one embodiment, beyond the fasteners mentioned above, no additional fasteners between the edges 78-84 exist so as not to interfere with articles moving in the chute 2.

In between the mechanical fastener at the side tab 34 and the mechanical fastener at the guide member 30, the section 76 is supported from below by (i) backbone member 28 and (ii) a rib 24, a bracket 26 or both a rib 24 and a bracket 26. Alternatively, the section 76 is additionally supported from below by a center tab 32. In an alternative embodiment, a section 76 of the plurality of sections is connected to the center tab 32 by a mechanical fastener. The mechanical fastener used for such a connection may not be visible from all viewing angles because the downstream edge 84 of an adjacent section 76 of the plurality of sections may be covering said mechanical fastener, thus blocking it from view when viewed from certain angles, e.g. from above.

Any of the mechanical fasteners that are used in the chute 2 may have low profiles, and smooth anchor surfaces, and may be located so as not to interfere with articles sliding in the chute 2.

A section 76 of the plurality of sections may be constructed of a variety of materials, in whole or in part. In other words, section of the plurality of sections may be constructed of a single material or many materials. Also, by way of example, a section 76 of the plurality of sections may be constructed in whole or in part by a first material, but an adjacent section 76 of the plurality of sections may be constructed in whole or in part by a second material different than the first material. By varying the materials of which a section 76 of the plurality of sections is constructed, one method of controlling the rate at which articles move along the chute 2 is provided. More particularly, different materials from which a section 76 of the plurality of sections may be constructed have different lubricities which results in articles traveling along them from going faster or slower.

It is also permissible to use varying amounts of a material or materials for a chute lining 14. For example, each section 76 of the plurality of sections may be of differing lengths, of similar lengths, or any combination of lengths. It can be appreciated that if a section 76 of the plurality of sections of a chute lining 14 is constructed of a material with a high lubricity, articles may travel along that portion faster than in another portion with a lower lubricity. The pitch, curvature and width of the chute 2 can also be varied to control the rate of travel of articles in the chute 2.

One exemplary material from which a section 76 of the plurality of sections may be constructed from in whole or part is DURA SURF™, a product of Crown Plastics of Harrison, Ohio. TIVAR™, available from Quadrant of Switzerland, may also be used in whole or in part with a section 76 of the plurality of sections. It has been found that any material with good general lubricity, with high resistance to wear, and which is capable of being formed into various shapes may work equally well. Such a material may be metal, wood, cardboard, plastic, glass, or any combination thereof.

It is preferable that the material selected for each section 76 of the plurality of sections be capable of being shaped. This permits the inboard edge 78 to be connected as stated above, and the outboard edge 80 to be connected as stated above and shown in FIGS. 1 and 5 to form a generally J-shaped section. It is also preferable that each section 76 of the plurality of sections be adapted to a downward slope, so that the downstream edge 84 is lower, and not in the same plane as the upstream edge 82.

As shown in FIG. 5, in one embodiment, an upstream edge 82 of one section 76 of the plurality of sections is overlapped by the downstream edge 84 of the next adjacent upstream section 76. This orientation prevents articles moving along the chute 2 from catching on a seam created by the adjoining edges.

By creating the lining 14 of the chute 2 from a plurality of sections, any one section 76 of the plurality of sections can be easily removed for any reason and replaced in whole or in part. Further, preferably each section 76 of the plurality of sections and the frame 10 are supported and suspended only by the stanchion 6, as described above, thus easily providing ready access to each section 76 of the plurality of sections.

In addition, as shown in FIG. 8, the chute 2 can be used in isolation from a stanchion. It is within the scope of the present invention to have a chute 2 that can be alternatively secured into its desired position. Any alternative means of support for the chute, or suspension is well within the scope of this invention. These alternatives may include, but are not limited to, suspending the chute from above (either from the ceiling or other structure or from an upstream object, such as a conveyer belt, for example), supporting the chute on the sides, suspending the chute from the sides, supporting the chute from below, or anchoring the chute to an object downstream from the chute so that the chute is self-suspending above the downstream object or any combination of the above. These alternatives may be achieved through the use of any mechanical means known in the art, which may include, but certainly not limited to, wires, posts, beams, glues, slings, bolts, nails, ties, and the like.

As would logically follow, the chute 2 may accordingly, comprise further elements that are needed for the final installation without falling outside the scope of the present invention. For example, eyebolts, hooks, further apertures for receiving mechanical fasteners, tabs, and flanges in varied locations are examples of some of the modifications that can be made to aid in installation without falling outside the scope of the present invention.

As mentioned above, chutes 2 of various sizes and shapes may be constructed in a similar manner to the depicted embodiments. For example, a straight chute, with no side to side turning may be made, or a chute with a single turn in any direction may be made.

The advantages of the present invention will be obvious to those skilled in the art. Such advantages include the modular nature of the chute, which makes construction and repair easy, accessible, and flexible.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A modular chute, down which to slide articles, comprising:
 1) a stanchion;
 2) a flange extending from the stanchion;
 3) a frame connected to the stanchion, the frame comprising:

a) a rib, wherein the rib comprises a first end portion, a second end portion, an upstanding portion, a base portion, a first surface, and a second surface,
b) a bracket connected to the flange, wherein the bracket has an attachment end portion, a non-attachment end portion, a base portion, an upstanding portion, a first surface, and a second surface,
c) a backbone member connected to either the rib or the bracket or to both the rib and the bracket, and
d) a guide member connected to either the rib or the bracket or to both the rib and the bracket, and
4) a curvilinear panel connected to the frame,
5) a lining disposed within the frame, the lining comprising a plurality of sections.

2. A chute as in claim 1, wherein the stanchion is connected to a base with mechanical fasteners, said base comprising a metal plate with substantially parallel upper and lower surfaces defining a substantially constant thickness.

3. A chute as in claim 2, wherein the stanchion extends substantially perpendicularly to the upper surface of the base.

4. A chute as in claim 1, wherein the curvilinear panel resides within a groove disposed in the attachment end portion of the bracket.

5. A chute as in claim 4, wherein each section of the plurality of sections is provided with an inboard edge, an outboard edge, an upstream edge, and a downstream edge, wherein the edges define a shape for each section of the plurality of sections.

6. A chute as in claim 5, wherein the shape defined by the edges can be any one shape selected from the group consisting of: polygonal, curvilinear, circular, and oval.

7. A chute as in claim 6, wherein the shape defined by the edges is generally trapezoidal, wherein the inboard edge is substantially equidistant from the outboard edge and the upstream edge and the downstream edge diverge from one another in the direction from the inboard edge to the outboard edge.

8. A chute as in claim 5, wherein the backbone member is connected to the base portion of the rib, or to the base portion of the bracket, or to the base portions of both the rib and the bracket.

9. A chute as in claim 5, wherein the guide member is connected to the upstanding portion of the rib, or to the upstanding portion of the bracket, or to both the upstanding portions of the rib and bracket.

10. A chute as in claim 5, wherein section of the plurality of sections is supported from below (i) by the backbone member and (ii) by the rib, or the bracket, or both the rib and the bracket.

11. A chute as in claim 5, wherein the frame further comprises a center tab, wherein the center tab is connected (i) to the backbone member in a plane substantially transverse to the backbone member and (ii) to the base portion of the rib in a plane substantially transverse to the base portion of the rib, or to the base portion of the bracket in a plane substantially transverse to the base portion of the bracket, or to both the base portion of the rib and the base portion of the bracket in a plane substantially transverse to both the base portion of the rib and the base portion of the bracket.

12. A chute as in claim 11, wherein a section of the plurality of sections is connected to the center tab.

13. A chute as in claim 5, wherein the frame further comprises a side tab, wherein the side tab is connected (i) to the curvilinear panel in a plane substantially transverse to the curvilinear panel and (ii) to the first end portion of the rib in a plane at an oblique angle to the first end portion of the rib, or to the attachment end portion of the bracket in a plane at an oblique angle to the attachment end portion of the bracket.

14. A chute as in claim 13, wherein the inboard edge of section of the plurality of sections, or portion adjacent said inboard edge, is connected to the side tab and the outboard edge of a section of the plurality of sections, or portion adjacent said outboard edge, is connected to the guide member.

15. A chute as in claim 5, wherein a section of the plurality of sections is connected to the frame by a mechanical fastener.

16. A chute as in claim 15, wherein the section of the plurality of sections has an uninterrupted surface between a first mechanical fastener at the inboard edge, or portion adjacent the inboard edge, and a second mechanical fastener at the outboard edge, or portion adjacent the outboard edge.

17. A chute as in claim 1, wherein a section of the plurality of sections is of a different material than another section of the plurality of sections.

18. A chute as in claim 1, wherein a section of the plurality of sections is of the same material than another section of the plurality of sections.

19. A chute as in claim 1, wherein a section of the plurality of sections is comprised of material.

20. A chute as in claim 17, wherein the material of a section of the plurality of sections is of a different lubricity than another material of another section of the plurality of sections.

21. A chute as in claim 5, wherein section of the plurality of sections is generally J-shaped and has a downward slope so that the downstream edge is lower than the upstream edge.

22. A chute as in claim 5, wherein the upstream edge of section of the plurality of sections is overlapped by the downstream edge of an adjacent section of the plurality of sections.

23. A chute as in claim 1, wherein a first frame and a second frame are connected by a mechanical fastener, wherein the first surface of the bracket of the first frame is in contact with the second surface of the rib of the second frame.

24. A chute as in claim 1, wherein a first frame and a second frame are connected by a mechanical fastener, wherein the first surface of the bracket of the first frame is in contact with the second surface of the bracket of the second frame.

25. A modular chute, down which to slide articles, comprising:
1) a stanchion, wherein the stanchion is connected to a base with mechanical fasteners, said base comprising a metal plate with substantially parallel upper and lower surfaces defining a substantially constant thickness, and wherein the stanchion extends substantially perpendicularly to the upper surface of the base;
2) a flange extending from the stanchion;
3) a frame connected to the stanchion, the frame comprising:
a) a rib, wherein the rib comprises a first end portion, a second end portion, an upstanding portion, a base portion, a first surface, and a second surface,
b) a bracket, wherein the bracket is connected to the flange extending from the stanchion and wherein the bracket comprises an attachment end portion, a non-attachment end portion, an upstanding portion, a base portion, a first surface, and a second surface,
c) a backbone member connected both to the base portion of the rib and to the base portion of the bracket,
d) a guide member connected both to the upstanding portion of the rib and to the upstanding portion of the bracket; and 4) a curvilinear panel, wherein the curvilinear panel is connected to the frame and wherein the curvilinear panel resides within a groove disposed in the attachment end portion of the bracket;

5) a lining disposed within the frame, the lining comprising:

a plurality of sections, wherein each section of the plurality of sections is provided with an inboard edge, an outboard edge, an upstream edge, and a downstream edge, wherein the edges define a shape for each section of the plurality of sections, wherein the shape defined is generally trapezoidal, wherein the inboard edge is substantially equidistant from the outboard edge and the upstream edge and the downstream edge diverge from one another in the direction from the inboard edge to the outboard edge, wherein section of the plurality of sections has a downward slope so that the downstream edge is lower than the upstream edge, wherein the upstream edge of section of the plurality of sections is overlapped by the downstream edge of an adjacent section of the plurality of sections, wherein section of the plurality of sections is supported from below (i) by the backbone member and (ii) by the rib, or the bracket, or both the rib and the bracket, and wherein section of the plurality of sections is connected to the frame by mechanical fastener.

26. A chute as in claim 25, wherein a first frame and a second frame are connected by mechanical fastener, wherein the first surface of the bracket of the first frame is in contact with the second surface of the rib of the second frame.

27. A chute as in claim 25, wherein a first frame and a second frame are connected by a mechanical fastener, wherein the first surface of the bracket of the first frame is in contact with the second surface of the bracket of the second frame.

28. A modular chute, down which to slide articles, comprising:
   1) a stanchion, wherein the stanchion is connected to a base with mechanical fasteners, said base comprising a metal plate with substantially parallel upper and lower surfaces defining a substantially constant thickness, and wherein the stanchion extends substantially perpendicularly to the upper surface of the base;
   2) a flange extending from the stanchion;
   3) a frame connected to the stanchion, the frame comprising:
      a) a rib, wherein the rib comprises a first end portion, a second end portion, an upstanding portion, a base portion, a first surface, and a second surface,
      b) a bracket, wherein the bracket is connected to the flange extending from the stanchion and wherein the bracket comprises an attachment end portion, a non-attachment end portion, an upstanding portion, a base portion, a first surface, and a second surface,
      c) a backbone member connected both to the base portion of the rib and to the base portion of the bracket,
      d) a guide member connected both to the upstanding portion of the rib and to the upstanding portion of the bracket,
      e) a center tab, wherein the center tab is connected (i) to the backbone member in a plane substantially transverse to the backbone member and (ii) to the base portion of the rib in a plane substantially transverse to the base portion of the rib or to the base portion of the bracket in a plane substantially transverse to the base portion of the bracket,
      f) a curvilinear panel, wherein the curvilinear panel is connected both to the first end portion of the rib and to the attachment end portion of the bracket and wherein the curvilinear panel resides within a groove disposed in the attachment end portion of the bracket, and
      g) a side tab, wherein the side tab is connected (i) to the curvilinear panel in a plane substantially transverse to the curvilinear panel and (ii) to the first end portion of the rib in a plane at an oblique angle to the first end portion of the least one rib or to the attachment end portion of the bracket in a plane at an oblique angle to the attachment end portion of the bracket;
   4) a lining disposed within the frame, the lining comprising:
   a plurality of sections, wherein each section of the plurality of sections is provided with an inboard edge, an outboard edge, an upstream edge, and a downstream edge, wherein the edges define a shape for each section of the plurality of sections, wherein the shape defined is generally trapezoidal, wherein the inboard edge is substantially equidistant from the outboard edge and the upstream edge and the downstream edge diverge from one another in the direction from the inboard edge to the outboard edge, wherein section of the plurality of sections has a downward slope so that the downstream edge is lower than the upstream edge, wherein the upstream edge of section of the plurality of sections is overlapped by the downstream edge of an adjacent section of the plurality of sections, wherein section of the plurality of sections is supported from below (i) by the backbone member and (ii) by the rib, or the bracket, or both the rib and the bracket, wherein section of the plurality of sections is connected to the center tab by mechanical fastener, wherein the inboard edge of section of the plurality of sections, or a portion adjacent said inboard edge, is connected to the side tab by a first mechanical fastener and the outboard edge of section of the plurality of sections, or a portion adjacent said outboard edge, is connected to the guide member by a second mechanical fastener, and wherein the section of the plurality of sections has an uninterrupted surface between the first mechanical fastener at the inboard edge, or portion adjacent the inboard edge, and the second mechanical fastener at the outboard edge, or portion adjacent the outboard edge.

29. A chute as in claim 28, wherein a first frame and a second frame are connected by a mechanical fastener, wherein the first surface of the bracket of the first frame is in contact with the second surface of the rib of the second frame.

30. A chute as in claim 28, wherein a first frame and a second frame are connected by a mechanical fastener, wherein the first surface of the bracket of the first frame is in contact with the second surface of the bracket of the second frame.

31. A modular chute, down which to slide articles, comprising
   1) a frame, the frame comprising:
      a) a rib, wherein the rib comprises a first end portion, a second end portion, an upstanding portion, a base portion, a first surface, and a second surface,
      b) a bracket, wherein the bracket has an attachment end portion, a non-attachment end portion, a base portion, an upstanding portion, a first surface, and a second surface,
      c) a backbone member connected to either the rib or the bracket or to both the rib and the bracket, and d) a guide member connected to either the rib or the bracket or to both the rib and the bracket,
2) a curvilinear panel connected to the frame, and
3) a lining disposed within the frame, the lining comprising a plurality of sections.

* * * * *